June 5, 1956  H. J. STEEL  2,748,986
MULTIPLE ROW SEEDER AND FERTILIZER SIDE DRESSER
Filed June 18, 1952  2 Sheets-Sheet 1
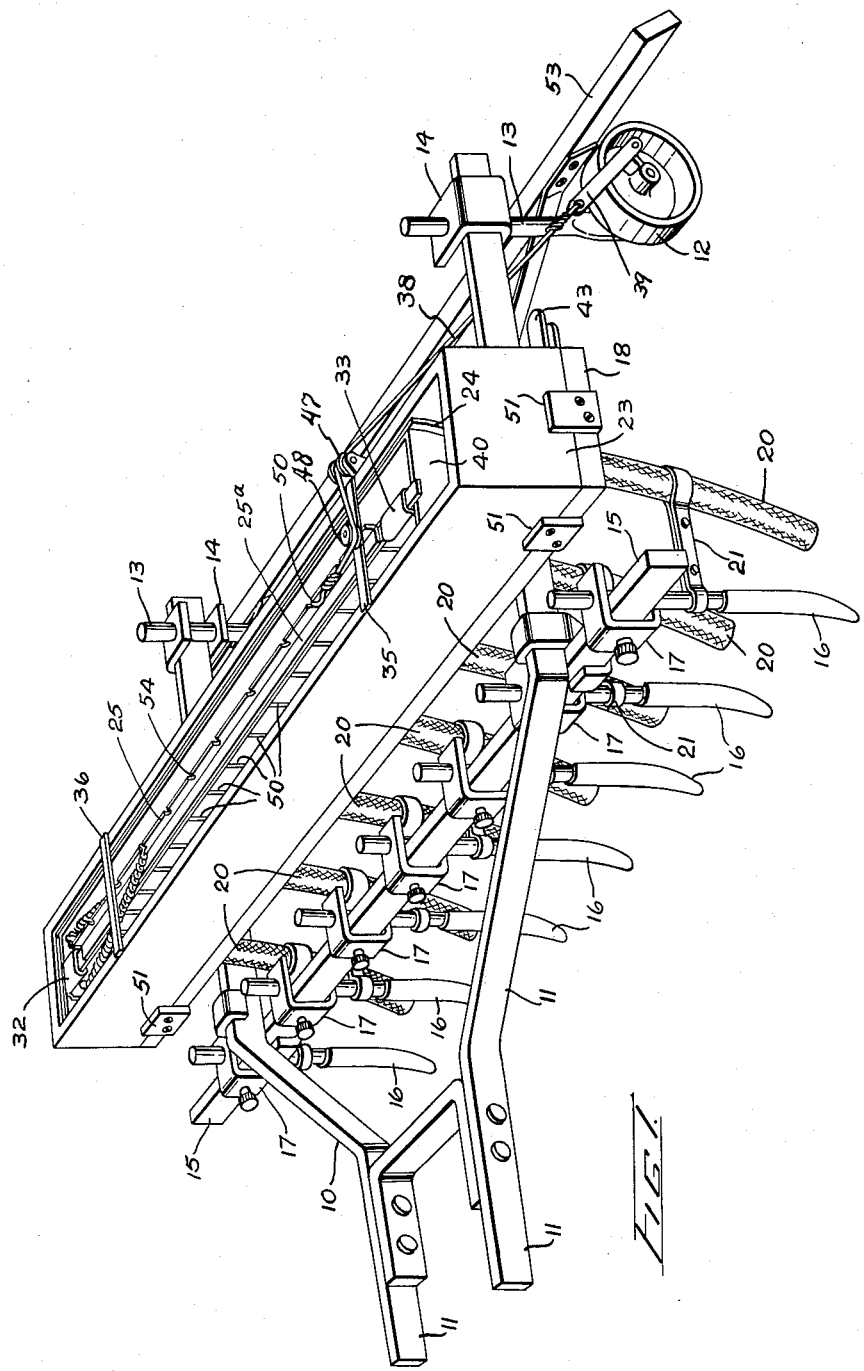
INVENTOR
HAROLD. J. STEEL
PER
ATTORNEY

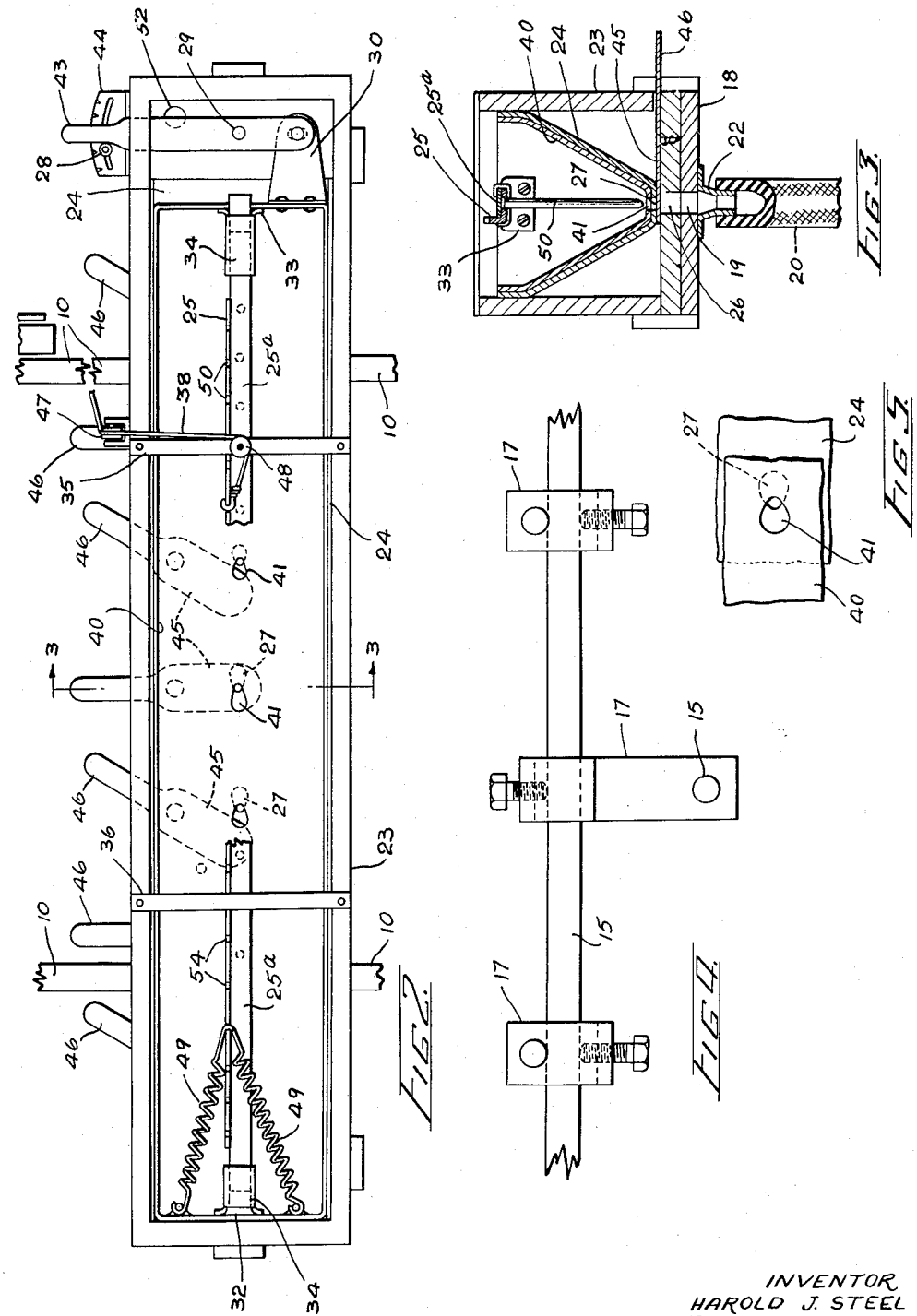

United States Patent Office 2,748,986
Patented June 5, 1956

2,748,986
MULTIPLE ROW SEEDER AND FERTILIZER SIDE DRESSER

Harold J. Steel, Islington, Ontario, Canada

Application June 18, 1952, Serial No. 294,187

4 Claims. (Cl. 222—177)

This invention relates to a seeding device and in particular to an attachment for garden type tractors for planting seeds and also for applying fertilizer.

An object of the present invention is to provide a seeding device for use in combination with garden tractors which will sow several rows of seeds at the same time and which can be regulated or adjusted for the various types of seeds used in planting garden crops.

In planting garden crops, it is essential for the market gardener to do so at certain recognized times in order to take full advantage of the best possible climatic conditions for crop growth and development. These periods are generally of very short duration, and it is therefore important that the seeding be done quickly and, with the least amount of manual or mechanical labour.

I am aware of the fact that apparatus has been developed for planting market garden crops one row at a time but this is a slow and expensive manner in which to plant seeds. However, the apparatus heretofore in use does not enable the market gardener to take full advantage of the growing period, particularly in northern climates. This will be obvious when it is fully understood that a market garden, in order to be a profitable venture, must produce several crops from the same acreage.

As the growing season is very short, it will be seen that the market gardener must observe a close schedule of planting crops to fully employ market garden land to the best possible advantage. Consequently, it is essential to provide a seeding machine which is extremely simple in construction, which is easily attached to or removed from the power driven garden tractor, which is easily dismantled for cleaning purposes, which can be repaired by the market gardener himself and which can be readily regulated to plant the many different sizes and shapes of seeds which are used in growing garden produce.

The object of the present invention, therefore, is to provide a multiple row seeding device which is simple in construction; which has a minimum of working parts; which may be easily dismantled for the purpose of cleaning or repair; which may be adjusted to sew different kinds of garden seeds; which will sow rows of any desired width or depth; and which is designed to be attached to and motivated by any type of garden tractor without modification except for minor adjustments.

Other and further objects and advantages of the present invention will be apparent from the following description and the accompanying drawings illustrating a preferred embodiment of the same in which:

Figure 1 is a perspective view of the rear part of the tractor frame carrying the tool bar showing the seeding device of the present invention mounted thereon.

Figure 2 is a plan view of the seeding device shown in Figure 1;

Figure 3 is a cross section on the line 3—3 Figure 2;

Figure 4 is a fragmentary plan view to show the cultivator teeth arranged in two parallel rows on the tool bar with the teeth of one row positioned centrally between the teeth of the other row.

Figure 5 is a diagrammatic view illustrating the shape of the seed outlets.

Like characters of reference refer to like parts throughout the specification and drawings.

The device illustrated in Figure 1 shows such parts of the tractor apparatus as are related to the present invention. These consist of a bifurcated tool frame 10 which is the rearward extension of the tractor frame 11. The forward end of the frame 11 supports the power plant, drive wheels and all the related driving parts including the cultivator handles by which the operator controls and directs the tractor apparatus. These parts are not shown since they form no part of the present invention and are so well known that they do not require description.

The rear end of the tool frame 10 is supported by a pair of cultivator wheels 12 (only one of which is shown), each wheel being connected to the frame by means of a post 13 and clamp 14 in the usual manner. These wheels govern the depth of the cultivator tool.

Mounted transversely on the tool frame is a tool bar 15 which carries a plurality of cultivator teeth 16 spaced laterally a predetermined distance apart. The cultivator teeth correspond in number to the total number of seed outlets of the seeding device. The cultivator teeth are mounted on the bar in the usual manner namely by means of a clamping member 17 and may be adjusted laterally to alter the spacing between the teeth or they may be individually elevated if desired. If desired the cultivator teeth 16 may be arranged in two rows, one in front of the other, as shown in Figure 4, with the teeth in one row covering the space between the teeth in the other row. The advantage of such spacing is that large pieces of sod, weeds, etc., will more readily pass between the teeth.

The seeding device comprises a base 18 which is mounted transversely on the frame 10 and is secured thereto in a more or less permanent manner since it can be left on the frame when the seeding attachment has been removed. The base is provided with spring members 51 for removably attaching the seeding device to the base. Other means, of course may be employed for that purpose. The base is provided with a plurality of seed outlets 19 at regular intervals corresponding in number and position to the seed outlets of the seeding device hereafter described. Leading from each seed outlet is a flexible seed tube 20. It will be seen that a tube is connected at the rear of the tooth immediately in front of it by a clamping member 21 with the outlet just above ground level. Each tube is connected to its appropriate seed outlet by means of a nipple 22 which is attached to the underside of the base 18 below each outlet.

The seeding device comprises a rectangular seed box 23, which may or may not be closed by a lid as desired, a first U-shaped trough 24, a second inner U-shaped trough 40, and an agitator 25.

The seed box 23 is formed with seed outlets 26 corresponding in number to openings in the base 18 and registering therewith. The first U-shaped trough 24 is formed, in the bottom thereof, with almond shaped seed outlets 27. The second inner U-shaped trough 40 rests on the trough 24 and is longitudinally movable with respect thereto. The troughs 24 and 40 are held in position by cross members 35, 36, which are secured to the top edge of the sides of the box by screws. The trough 40 is provided, in the bottom thereof, with almond shaped seed outlets 41 positioned so that the narrow end will be adjacent the narrow end of the outlets 27 in the trough 24. Figure 5 is a diagrammatic view to illustrate the shape of the seed openings 27 and 41 and it will be seen that a substantially round opening is provided for all sizes of seeds by sliding the U-trough 40 in the trough 24 in the following manner. The trough 40 is arranged in the trough 24 so that it can be slid longitudinally in order to regulate the size of the seed outlet formed by the outlets 27 and 41 which are complemental to each other. This longitudinal adjustment is effected by the shut-off lever 43, quadrant 44 and adjustable stop 28. The lever is pivotally connected to the box 23 at 29 and is connected to the U-trough 40 by member 30. The position of the stop 28 determines the size of the seed outlet formed by the outlets 27, 41. The quadrant may be indexed, if desired, for the most common varieties of seeds. The lever 43 may be connected to the clutch mechanism of the tractor so that, by operating the mechanism which disengages the clutch of the tractor, the lever 43 will be operated automatically, thereby, to close the seed opening by shifting the position of the trough 40. The lever 43 can also be arranged to automatically move to the open position when the clutch of the tractor is engaged but I prefer to have this done manually since in a seeding operation it is necessary to engage the clutch of the tractor to turn the same into another row to be planted during which period it is not desirable that the seeds should be dropping from the machine since that would involve considerable wastage. Consequently, I prefer that the lever 43 should be actuated manually to open position.

Each seed outlet is provided with a shut-off valve 45 which is pivotally mounted in the bottom of the seed box and situated to lie between the bottom of the trough 24 and the top surface of the bottom of the seed box 23. For easy operation, the shut-off valve is provided with a handle 46 extending through the outside wall of the seed box.

The agitator 25 consists of a metal bar of angle iron perforated at predetermined intervals to provide openings for a plurality of agitating fingers 50 entered through said perforations and terminating a short distance above the bottom of the trough 40. The agitating fingers may be formed from nails of the correct length and held in place by a bar 25a secured on the top of the agitator as shown. The agitator is reciprocatably supported at each end by brackets 32, 33. The brackets 32, 33 are attached to opposite ends of the trough 40, each bracket being formed with a sleeve like horizontal extension 34 in which the agitator slides. The oscillation of the agitator within the seed box is effected by the joint action of a cable 38, springs 49. The springs may be made of metal, rubber or other elastic material. The springs have one end connected to the top edge of the frame equi-distant from the longitudinal centre line of the box. The other ends of the spring are connected to the agitator 25. This construction gives a straight line pull on the agitator. The cable 38 has one end connected to an eccentric arm 39, mounted on the wheel 12, passing through pulleys 47, 48 to have its other end connected to the agitator 25. It is necessary to adjust the cable 38 when the wheel 12 is raised or lowered and for this purpose a number of notches 50 are cut in the top edge of the agitator as shown. Likewise as it may be necessary to vary the tension of the springs 49, the end of the agitator adjacent the springs is provided with a series of notches 54 as shown. In order that the seed box may be cleaned out a clean-out hole 52 is provided in the bottom of the seed box at each end thereof.

The manner in which the seeding device is employed is as follows: The base 18 is attached across the frame 10 by means of bolts or any other well known manner. The base may be more or less permanently secured to the frame since it is not necessary to remove the same once it is installed. The seeding box 23 is mounted on the base 18 and removably attached thereto by the springs 51. The trough 40 is slidable longitudinally by means of the lever 43, to a position that will adjust the openings formed by the outlets 27, 41 to the correct size for the seeds to be planted. The adjustable stop 28 is then set to stop the lever 43 at this position during operation.

The cable 38 is connected at one end to the agitator 25, then passed over pulleys 48 and 47 and connected, at its other end, to the eccentric arm 39 and the trough 40 filled with seeds. The device is set to plant the desired number of rows by opening the same number of shut off valves 45, the spacing between the rows being regulated by the position of the cultivator teeth 16 on the toll bar 15. The tractor is then started and the seeding operation commences. The eccentric arm 39 and spring 49 oscillates the agitator back and forth in the trough 40 which movement feeds the seeds into the seed outlets. When the operator reaches the end of a row, the lever 43 is turned to the "off" position, either manually or mechanically, which closes all of the seed outlets, thus preventing wastage of seed during the turning of the tractor. As soon as the tractor is in a position to commence the new set of rows, the lever 43 is moved until it contacts the adjustable stop 28 and the device is again set for planting seeds.

There is also provided a means for covering the seeds which means consists of a hinged drag 53 attached to the rear of the tractor frame.

In addition to the planting of seeds, the device may be used for applying fertilizer side dressing. During the growing period deficiencies in plant food will be apparent to the experienced gardener. By making tests of plants and soil, the gardener can establish the nature of the deficiency. The gardener can then, with the use of the foregoing device and by adjusting the seed outlets supply the deficient plant food. When applying side dressing the teeth are lowered so that the earth is self covering and it is not necessary to employ the drag.

The device can also be used for broadcasting seed or fertilizer by disconnecting the tubes from the outlets or by removing the tubes entirely.

What I claim as new and desire to protect by Letters Patent of the United States is:

1. For a garden type tractor, a seeding attachment comprising a base attachable to the frame of the tractor and having a plurality of uniformly spaced outlets located on the longitudinal centre line thereof, a seed box removably mountable on said base and having seed outlets corresponding in number to and registering with the outlets in said base, a first U-shaped trough mounted in said box and having seed outlets registering with the outlets in the seed box, a second longitudinally adjustable U-shaped trough within the first trough and having seed outlets therein positioned to be moved into registration with the seed outlets in the first trough, means for horizontally adjusting the second trough relative to the first mentioned trough to provide a seed outlet of a predetermined size, an agitator mounted horizontally in said second trough and having agitating members extending downwardly into close proximity to the bottom of the trough and means reciprocating said agitator in a horizontal plane to and fro over said openings.

2. A seed dispensing device according to claim 1 in which the means for reciprocating said agitator bar consists of a spring tensioning said bar and of an eccentric arm driven by a wheel of said tractor, a cable connected to said arm and to said bar to move said bar in one direction and tension said spring whereby said bar is reciprocated by the combined action of said spring and said cable.

3. For a garden type tractor, a seeding attachment comprising a base attachable to the frame of the tractor and having a plurality of uniformly spaced outlets located on the longitudinal centre line thereof, a seed box removably mountable on said base and having seed outlets corresponding in number to and registering with the outlets in said base, a first fixed U-shaped trough in said box and having almond shaped seed outlets registering with the outlets in the seed box, a second longitudinally adjustable U-shaped trough within the first trough and having almond shaped seed outlets therein positioned to be moved into registration with the seed outlets in the first trough, the narrow ends of contiguous outlets of the said troughs facing each other and means for adjusting the second trough longitudinally relative to the first trough to move the outlet of the second trough over the outlet of the first trough to form a seed outlet of the size of the seed to be dispensed through said oulet, and a longitudinally reciprocatable agitator bar mounted horizontally in said seed box above said second trough and having a plurality of agitating fingers extending downwardly to a point adjacent the bottom of said trough and arranged to sweep over said seed outlet.

4. A seed dispensing device for attachment to a garden type tractor comprising a base attachable to the frame of the tractor and having a plurality of uniformly spaced outlets located on the longitudinal centre line thereof, a seed box removably mountable on said base and having seed outlets corresponding in number to and registering with the outlets in said base, a first fixed U-shaped trough in said box and having almond shaped seed outlets registering with the outlets in the seed box, a second longitudinally adjustable U-shaped trough within the first trough and having almond shaped seed outlets therein positioned to be moved into registration with the seed outlets in the first trough, the narrow ends of contiguous openings of the said troughs being adjacent each other and means for sliding the second trough longitudinally relative to the first trough to move the outlet of the second trough over the outlet of the first trough to form a seed outlet of the size of the seed to be dispensed through said seed outlet, and a longitudinally reciprocatable agitator bar mounted horizontally in said seed box above second trough and having a plurality of agitating fingers extending downwardly to a point adjacent the bottom of said trough and arranged to sweep over said openings.

References Cited in the file of this patent

UNITED STATES PATENTS

| | | |
|---|---|---|
| 12,256 | Morgan | Jan. 16, 1855 |
| 52,295 | Lakin | Jan. 30, 1866 |
| 101,836 | Dillier | Apr. 12, 1870 |
| 222,078 | Richardson | Nov. 25, 1879 |
| 241,924 | Buswell | May 24, 1881 |
| 331,600 | Zeigler et al. | Dec. 1, 1885 |
| 493,146 | Bender | Mar. 7, 1893 |
| 507,796 | Ferris | Oct. 31, 1893 |
| 734,631 | Stubbs | July 28, 1903 |
| 793,792 | Johnston | July 4, 1905 |
| 1,125,508 | Gaston et al. | Jan. 19, 1915 |
| 1,307,327 | Van Nort | July 17, 1919 |
| 1,806,728 | Willits | May 26, 1931 |
| 2,510,231 | Juzwiak | June 6, 1950 |
| 2,554,074 | Tuttle | May 22, 1951 |
| 2,624,492 | Seltzer | Jan. 6, 1953 |